United States Patent

Bussani et al.

(10) Patent No.: US 8,285,786 B2
(45) Date of Patent: Oct. 9, 2012

(54) CONFIDENTIAL PRESENTATIONS IN VIRTUAL WORLD INFRASTRUCTURE

(75) Inventors: Anthony Bussani, Adliswil (CH); Jan L. Camenisch, Thalwil (CH); Thomas R. Gross, Zurich (CH); Dirk Husemann, Einsiedeln (CH); Dieter M. Sommer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/201,107

(22) Filed: Aug. 29, 2008

(65) Prior Publication Data

US 2010/0058443 A1    Mar. 4, 2010

(51) Int. Cl.
*G06F 15/16* (2006.01)
*G06F 3/048* (2006.01)

(52) U.S. Cl. ........................ 709/204; 715/757
(58) Field of Classification Search .......... 715/757; 709/204

See application file for complete search history.

(56) References Cited

U.S. PATENT DOCUMENTS

| | | | | |
|---|---|---|---|---|
| 5,347,306 A * | 9/1994 | Nitta | 348/14.1 |
| 5,644,766 A * | 7/1997 | Coy et al. | 1/1 |
| 6,175,842 B1 * | 1/2001 | Kirk et al. | 715/205 |
| 6,401,122 B1 * | 6/2002 | Matsui et al. | 709/227 |
| 6,476,830 B1 * | 11/2002 | Farmer et al. | 715/769 |
| 6,559,863 B1 * | 5/2003 | Megiddo | 715/753 |
| 6,687,739 B2 * | 2/2004 | Anupam et al. | 709/204 |
| 6,772,335 B2 * | 8/2004 | Curtis et al. | 713/163 |
| 6,796,407 B2 * | 9/2004 | Buckley et al. | 188/359 |
| 6,798,407 B1 | 9/2004 | Benman | |
| 6,934,747 B1 * | 8/2005 | McGrath et al. | 709/224 |
| 7,069,299 B2 * | 6/2006 | Rhee et al. | 709/204 |
| 7,124,164 B1 * | 10/2006 | Chemtob | 709/204 |
| 7,287,053 B2 * | 10/2007 | Bodin | 709/204 |
| 7,478,129 B1 * | 1/2009 | Chemtob | 709/204 |
| 2002/0178271 A1 * | 11/2002 | Graham et al. | 709/229 |
| 2002/0188678 A1 * | 12/2002 | Edecker et al. | 709/204 |
| 2004/0015579 A1 * | 1/2004 | Cooper et al. | 709/223 |
| 2007/0011273 A1 * | 1/2007 | Greenstein et al. | 709/217 |
| 2008/0009345 A1 * | 1/2008 | Bailey et al. | 463/29 |
| 2008/0010605 A1 * | 1/2008 | Frank | 715/765 |
| 2008/0263460 A1 * | 10/2008 | Altberg et al. | 715/757 |
| 2009/0106671 A1 * | 4/2009 | Olson et al. | 715/757 |

OTHER PUBLICATIONS

"Hotel Group to Host Second Life Meetings," http://www.e-consultancy.com, 2006, 3 pages.

P. Curtis et al., "Jupiter Audio/Video Architecture: Secure Multimedia in Network Places," Procs. of the 3rd International Multimedia Conference and Exhibition, Multimedia'95, Nov. 1995, pp. 79-90, California.

* cited by examiner

*Primary Examiner* — Firmin Backer
*Assistant Examiner* — Michael A Chambers
(74) *Attorney, Agent, or Firm* — Daniel P. Morris; Ryan, Mason & Lewis, LLP

(57) ABSTRACT

Methods and apparatus for forming and presenting confidential presentations within a computing environment associated with a virtual application are presented. For example, a method for forming a confidential presentation includes obtaining a correspondence indicator from an asset server, obtaining a first texture from the asset server, and overlaying the first texture onto a first object. The correspondence indicator indicates the first texture corresponds to the first object. The first object is within the computing environment associated with the virtual application. The first texture and the asset server are inaccessible by the computing environment associated with the virtual application. The confidential presentation comprises the first texture.

22 Claims, 6 Drawing Sheets

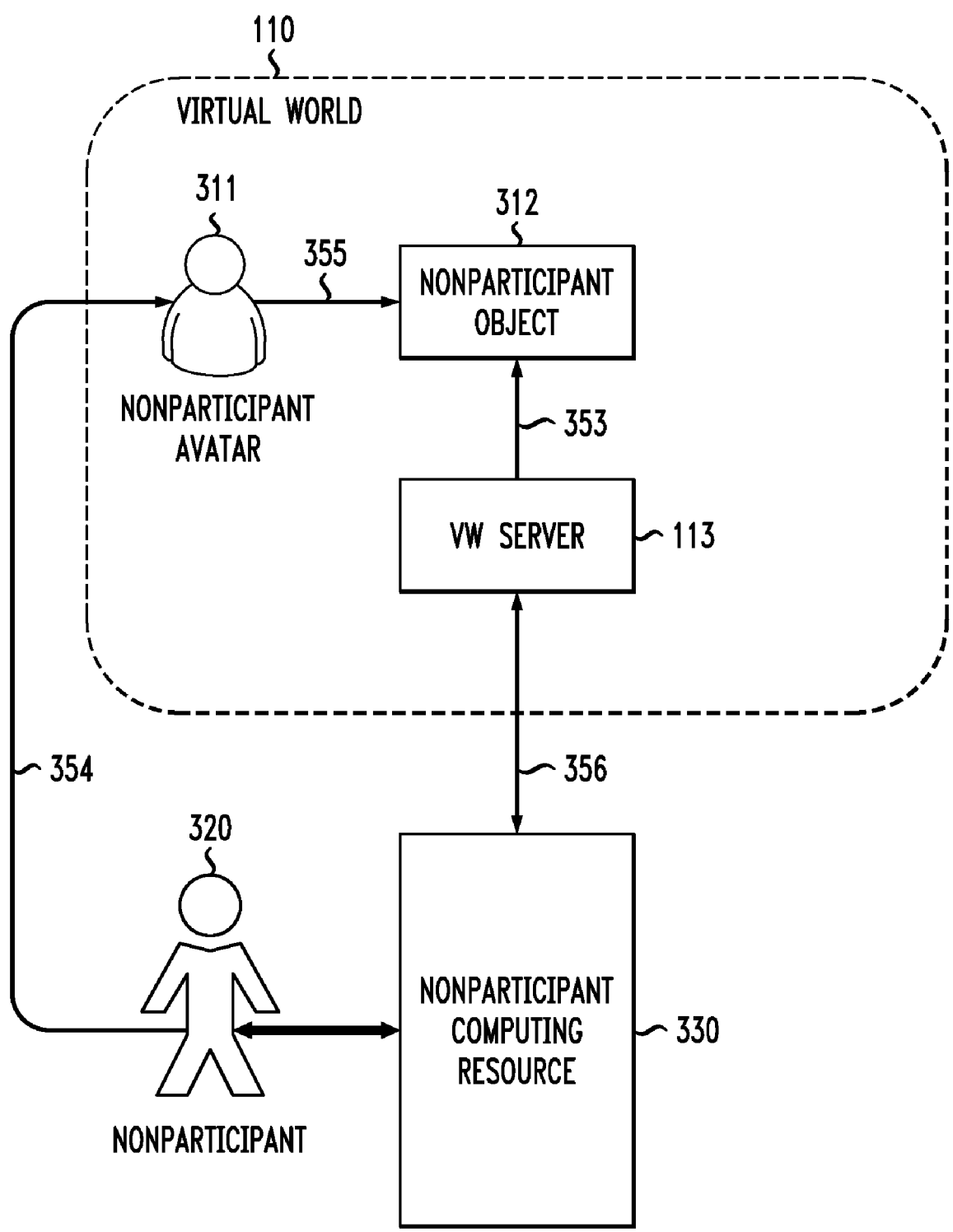

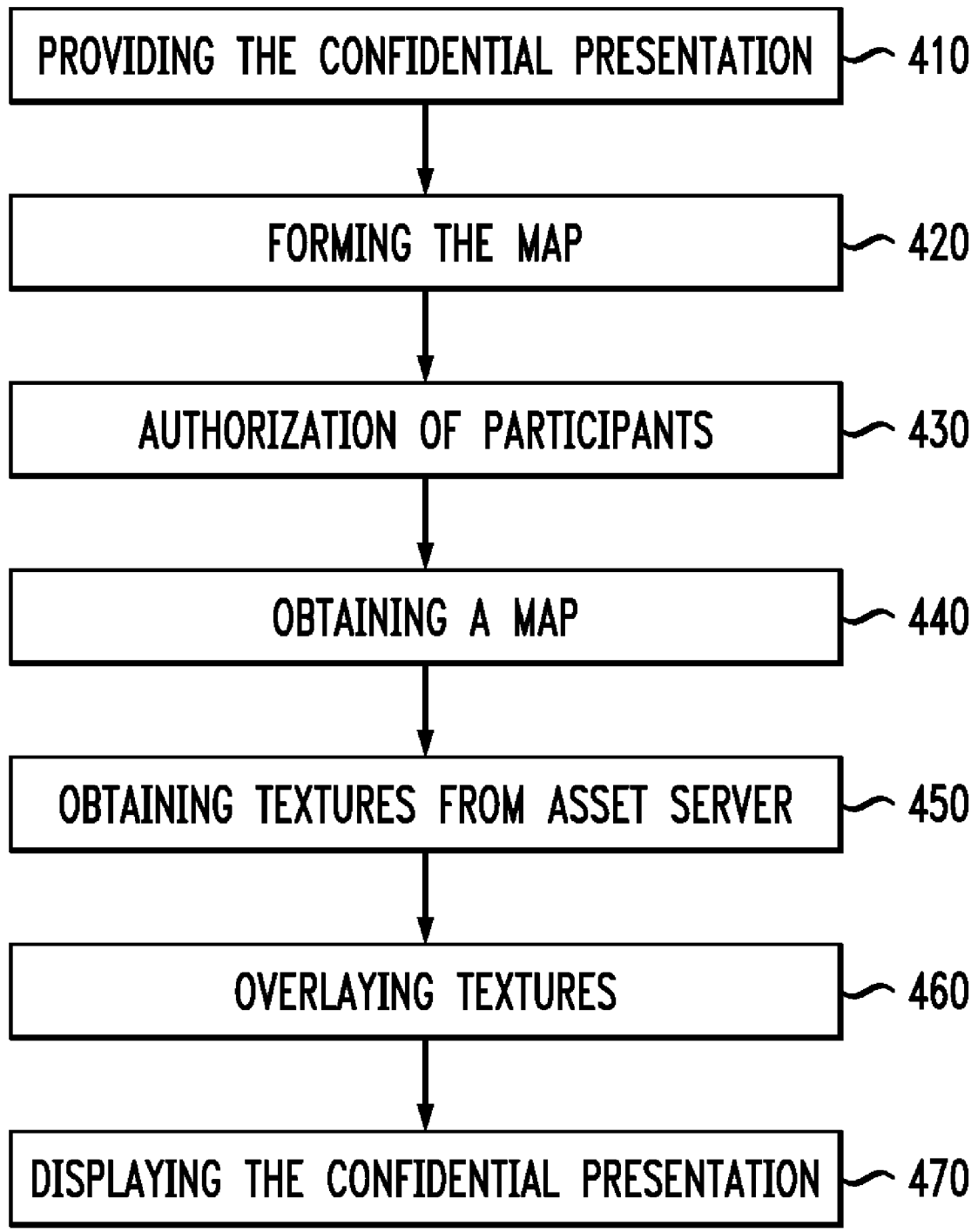

FIG. 5
500

LET $U = \{u1, u2, u3, u4, u5, u6, u7, u8, u9, u10, u22, u\_k\}$ BE A SET OF ALL UUIDs FOR SCREENS ON AN ASSET SERVER
LET $P = \{p1, p2, p3, p4, p5, p6, p7, p\_l\}$ BE A SET OF SLIDE IDENTIFIERS FOR ALL SLIDES ON AN ASSET SERVER

LET $U' = \{u1, u2, u3, u22, u\_k\}$ BE A SET OF UUIDs FOR SCREENS OF A PRESENTATION
LET $P' = \{p1, p2, p3, p4, p\_l\}$ BE A SET OF SLIDE IDENTIFIERS FOR THE SLIDES OF THE PRESENTATION

| MAP OF PRESENTATION | |
|---|---|
| SLIDE IDENTIFIER | SCREEN UUID |
| p1 | u1 |
| p2 | u3 |
| p3 | u_k |
| p4 | u2 |
| p_l | u_22 |

600

US 8,285,786 B2

CONFIDENTIAL PRESENTATIONS IN VIRTUAL WORLD INFRASTRUCTURE

FIELD OF THE INVENTION

The present invention relates generally to confidential presentations within a virtual world, and more particularly the invention relates to providing confidential presentations within a virtual world infrastructure where confidential information is mapped onto virtual world objects, and resides only outside of the virtual world.

BACKGROUND OF THE INVENTION

A virtual world is a computer-based simulation environment where users are intended to inhabit and interact via avatars. A user accesses a computer-simulated world which presents perceptual stimuli to the user, who in turn can manipulate elements of the modeled world and thus experiences telepresence to a certain degree. Such modeled worlds may appear similar to the real world or instead may depict fantasy worlds Virtual worlds are not limited to games but can encompass computer conferencing and text based chat rooms.

By way of example, virtual worlds (VWs), such as Second Life, offer avatars public places in which to meet and hold meetings. However, within a company environment, not all meetings are open to the public. Confidential meetings are often necessary. The community aspects of virtual worlds directly conflict with the need for confidential meetings. In virtual worlds, the servers, and therefore the operators of the virtual world, usually learn the content and metadata of all objects because they need to distribute these pieces of data to the community as part of the virtual world environment. Thus, the goal of confidentiality affects other users of the virtual world and the virtual world server infrastructure.

SUMMARY OF THE INVENTION

Principles of the invention provide, for example, methods and apparatus for forming and presenting confidential presentations within a virtual world, that is, a computing environment associated with a virtual application. Confidential textures are mapped onto objects, for example, screens existing within the virtual world. The confidential textures exist only outside of the virtual world in a secure environment. The confidential textures can be slides of a confidential presentation.

For example, in accordance with one aspect of the invention, a method for forming a confidential presentation is provided. The method for forming the confidential presentation comprises obtaining a correspondence indicator from an asset server, obtaining a first texture from the asset server, and overlaying the first texture onto a first object. The correspondence indicator indicates the first texture corresponds to the first object. The first object is within a computing environment associated with a virtual application. The first texture and the asset server are inaccessible by the computing environment associated with the virtual application. The confidential presentation comprises the first texture.

Since the asset server is inaccessible by the computing environment associated with the virtual application, it may be considered a confidential asset server.

In accordance with another aspect of the invention, a network for forming a confidential presentation is provided. The network for forming the confidential presentation comprises an asset server, and a proxy. The method for forming the confidential presentation comprises obtaining a correspondence indicator from the asset server, obtaining a first texture from the asset server, and overlaying the first texture onto the first object. The correspondence indicator indicates the first texture corresponds to a first object. The first object is within a computing environment associated with a virtual application. The first texture is overlaid by the proxy. The first texture and the asset server are inaccessible by the computing environment associated with the virtual application, and the confidential presentation comprises the first texture.

Advantages of the invention include, for example: enabling confidential meetings and presentations within a virtual world, where confidential material exists only on secure resources residing exclusively outside of the virtual world; and enabling meeting nonparticipants to view alternate non-confidential material, such as, for example, advertisements.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 3 illustrates apparatus for a non-confidential presentation according to a third exemplary embodiment of the invention.

FIG. 4 shows a method for forming a confidential presentation according to a fourth exemplary embodiment of the invention.

FIG. 5 illustrates a map, or a correspondence indicator, according to an exemplary embodiment of the invention.

DETAILED DESCRIPTION OF THE INVENTION

Figure 1:
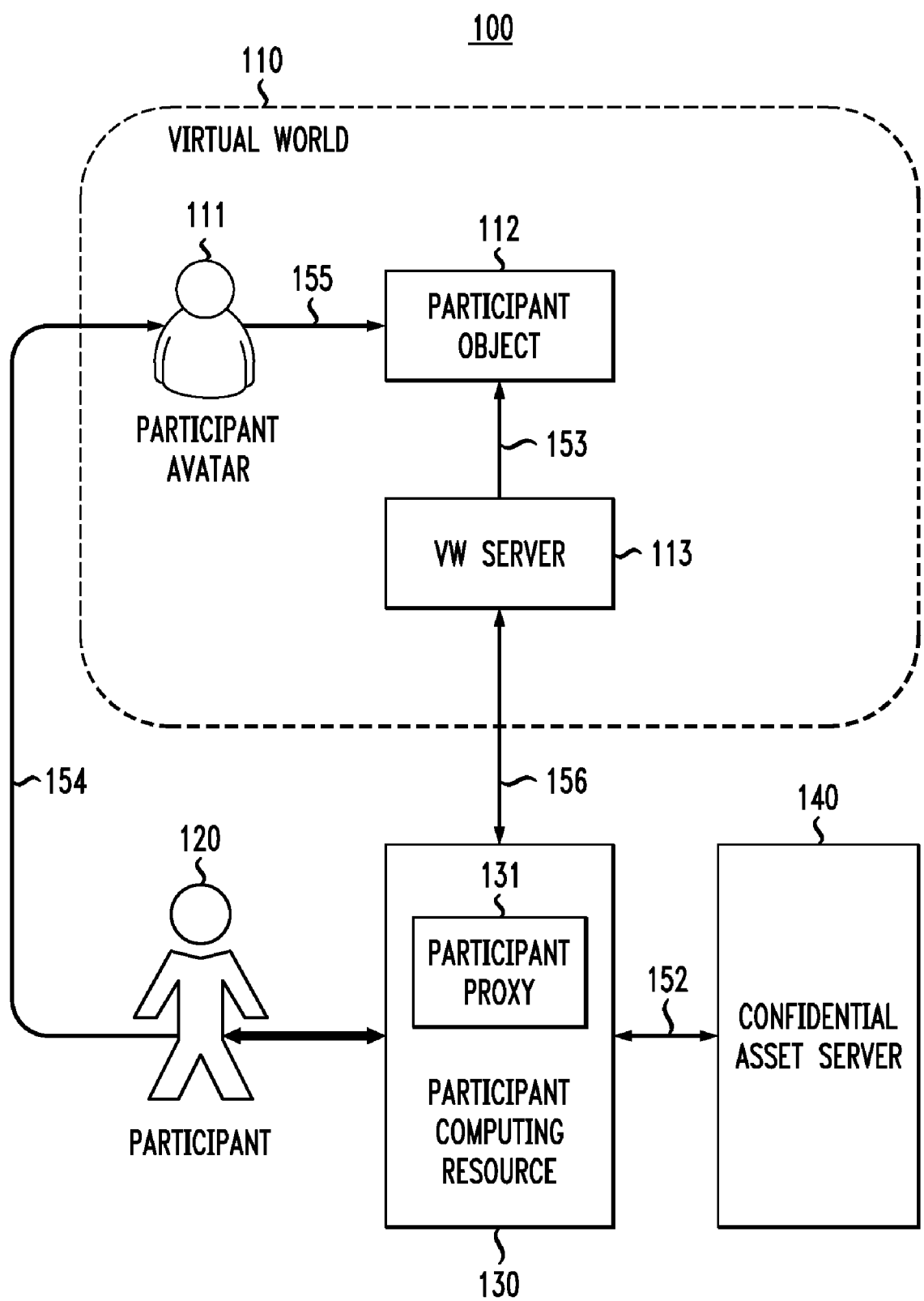
FIG. 1 illustrates apparatus for attending a confidential presentation according to a first exemplary embodiment of the invention.

An asset is an item in a virtual world. Assets include, but are not limited to, objects, shapes of objects, textures, digitized audio clips, avatar shape and appearance, avatar skin textures, scripts, and information written on note cards. Each asset is referenced by a Universally Unique Identifier (UUID). Assets are typically stored on a server, for example, one or more asset servers, supporting the virtual world.

The term confidential asset server, as used herein, is a secure computing resource that stores and provides at least one texture and at least one map for a confidential presentation. The confidential asset server, optionally, may also form the map. The confidential asset server is only outside of the virtual world. The confidential asset server being only outside of the virtual world means that the confidential asset server is not part of the virtual world infrastructure. The confidential asset server does not reside on, and is not accessible by, any computing device or other computing infrastructure maintained by a service provider of the virtual world application.

Access to the confidential asset server is limited to authorized entities, such as participants, persons hosting the confidential meeting (hosts), and the computer resources or clients of participants and persons hosting the confidential meeting. Nonparticipants are denied access to the confidential asset server. The confidential asset server typically stores confidential information. Confidential asset servers are not necessarily associated with an item in a virtual world termed an "asset."

An avatar is a representation inside of the virtual world of a computer user. The avatar can be in the form of a three-dimensional model, a two-dimensional icon or picture, or a text construct. As used herein, an avatar is an object representing, within a virtual world, the embodiment of the user.

A host is the person or user controlling, originating, hosting, or providing content for a secure meeting or confidential presentation. The host is, for example, a person hosting the secure meeting or confidential presentation. The host typically provides the confidential presentation.

The term nonparticipant, as used herein, specifies a user not authorized to attend a secure meeting or confidential presentation.

The term participant, as used herein, specifies a user authorized to attend a secure meeting or confidential presentation.

The term proxy, as used herein, is a computing entity, typically a computing entity associated with a participant and/or a meeting host, adapted injecting data into a virtual world data stream. The proxy may also be adapted to filtering data or removing data from the virtual world data stream. The proxy is only outside of the virtual world.

Second Life is an internet based virtual world.

In general, a texture is a digital image within or outside of a virtual world. A texture can comprise a pattern or a more complex image including shape, form or text. A texture may decorate an object. A texture may be a confidential texture or a non-confidential texture. To distinguish between non-confidential textures and confidential textures, a confidential texture comprises information or data that is part of a confidential presentation, for example, confidential information or confidential data. A texture that is provided by, or resides within, a confidential asset server is a confidential texture. A confidential texture may be, for example, a presentation slide. As used herein, a texture that is confidential is only available outside of the virtual world.

A Universally Unique Identifier (UUID) is an identifier, for example, an identifier according to a standard used in software construction. The typical UUID is standardized by the Open Software Foundation as part of the Distributed Computing Environment. The intent of UUIDs is to enable distributed systems to uniquely identify information without significant central coordination. Thus, anyone can create a UUID and use it to identify something with reasonable confidence that the identifier will never be unintentionally used to identify anything else. Information or items labeled with UUIDs can therefore be combined into a single database without needing to resolve name conflicts. UUIDs are used to identify objects within a virtual world.

A virtual world is a computing environment associated with a virtual application, that is, a computer-based simulation environment where users are intended to inhabit and interact via avatars. A uses accesses, through a computer, a computer-simulated world which presents perceptual stimuli to the user, who in turn can manipulate elements of the modeled world and thus experiences telepresence to a certain degree. Such modeled worlds may appear similar to the real world or instead may depict fantasy worlds. The model world may simulate rules based on the real world, rules of the fantasy world, or hybrid rules of real and fantasy worlds. Communication between users may include, but is not limited to, text, graphical icons, visual, video, sound, and forms using touch and balance senses. Communication with real-time voice communication using voice-over-Internet-protocol (VOIP) is also possible. Virtual worlds are not limited to games but can encompass computer conferencing and text based chat rooms.

There is a need to enable confidential and secure meetings in virtual worlds such that the audio and video channels can be secure, having content available to only authorized people, i.e., the people invited to the meeting.

An aspect of the invention is a method for one or more objects, which exists within the VW, to display slides of a presentation using textures. Although the objects exist within the VW, some slides and some textures, for example, those that are confidential, do not exist within the VW. The textures will be different for meeting participants than for nonparticipants. The participants will view the actual presentation slides. The nonparticipants, as well as the VW server infrastructure, will receive default pictures, e.g., advertisements. The participants will get the presentation slide textures from a dedicated confidential asset server, access to which is granted only to participants.

Features of the invention include, for example: allowing arbitrary renderable content, for example, text, pictures, slides, presentations and video streams to be displayed to multiple participants, the content can extend arbitrary assets, and the content can not only come from the computing resource of the participant or host, but can be obtained from a confidential asset server typically coupled to the Internet or an intranet. These features make the invention highly suitable for realizing confidential business presentations in virtual worlds.

The following describes how the virtual presentation functions, how it obtains the secure content, and how the content is controlled by the presenter or host.

As shown in FIG. 1, a first embodiment of the invention 100 comprises: a participant object 112 within a VW 110 on which textures are rendered; a participant proxy 131 residing at or within a client or participant computing resource 130; and a confidential asset server 140 located only outside of the virtual world 110. The confidential asset server 140 stores confidential information, for example, the confidential presentation. Access to the confidential asset server 140 is allowed only to participants 120, hosts 220 (FIG. 2), and, optionally, other authorized individuals and entities. Confidential asset server 140 is not available to other non-authorized individuals, and is not otherwise generally available within the VW 110. An example of the participant object 112 is a screen onto which textures are rendered. The textures are, for example, slides of a confidential presentation. In alternate embodiments, textures are, for example, audio, text, pictures or video streams. The participant proxy 131 is adapted to removing data from the VW data stream; in this case, removing data from the data stream coming from the VW 110, for example, form the VW servers 113, to the participant computing resource 130. The term VW data stream, as used herein, comprises the data stream coming from the VW 110, for example, from the VW servers 113, to the participant computing resource 130 or host computing resource 230 (FIG. 2), and the data stream going from the participant computing resource 130 or the host computing resource 230 to the VW 110, for example, to the VW servers 113. Because the participant computing resource 130 comprises the participant proxy 131, data reaching the participant computing resource 130 is available to the participant proxy 131. The participant computing resource 130 is typically associated with the participant 120. Other participants (not shown) have their own computing resources (not shown).

FIG. 1 further shows participant avatar 111 within the virtual world 110. As indicated by the participant-to-avatar link 154, participant avatar 111 is typically associated with and, at least partially, under the control of the participant 120. The avatar-to-object link 155 indicates that participant avatar 111 at some time can "see", within the VW 110, participant object 112. Data from the VW server 113 goes to the participant computing resource 130 through a VW-to-proxy network link 156. Data goes from the confidential asset server 140 to the participant proxy 131 through a confidential asset server-to-computer resource network link 152.

A screen is an object, for example, the participant object 112 in FIG. 1, in VW 110, having a UUID. In this case, a texture, for example, a slide, can be mapped onto the screen. Alternatively, the screen could comprise a plurality of objects, each object having a UUID. In this case, for each object, a texture, for example, a slide, can be mapped onto the screen.

Figure 2:
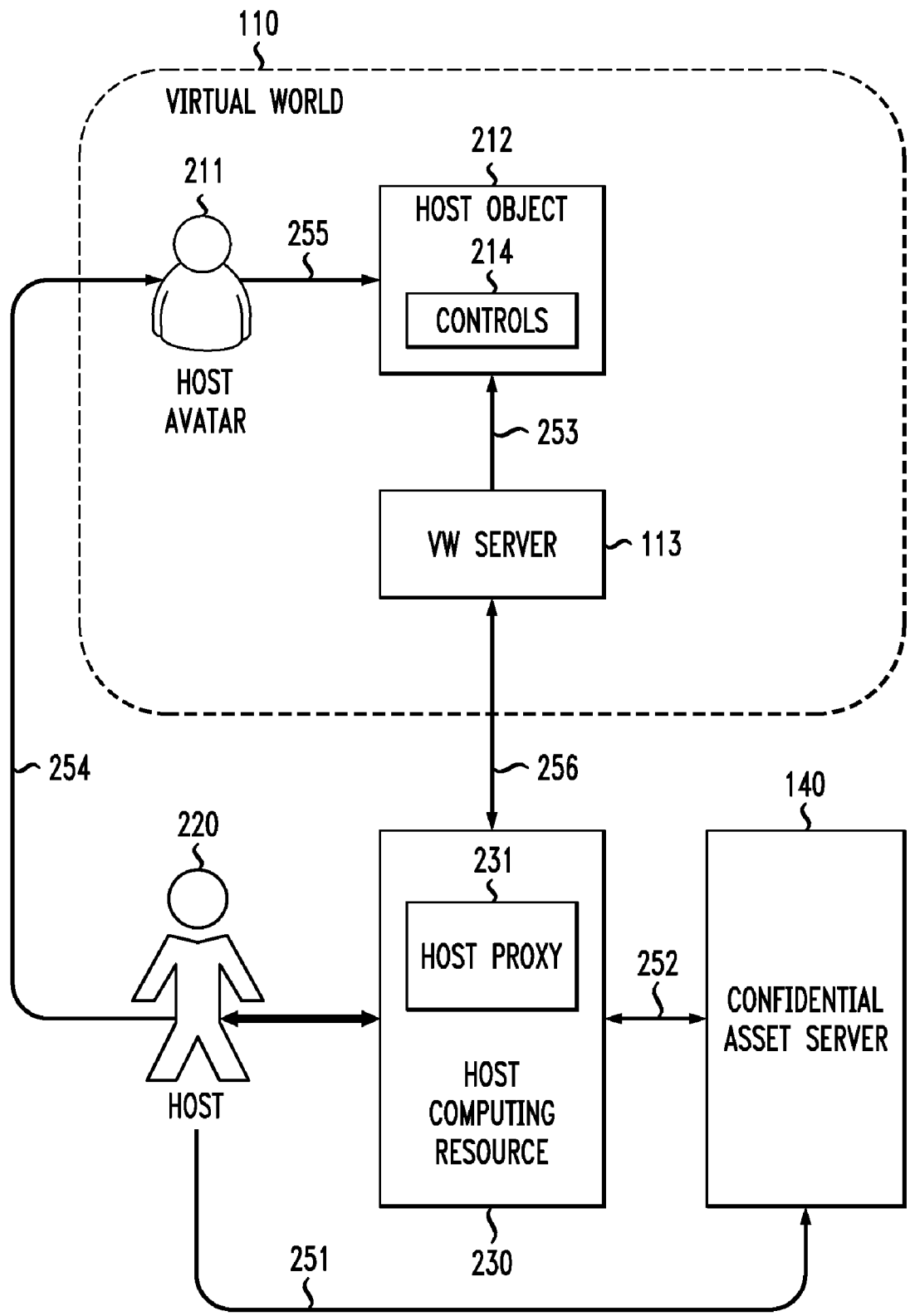
FIG. 2 illustrates apparatus for forming and hosting a confidential presentation according to a second exemplary embodiment of the invention.

FIG. 2 illustrates a second embodiment of the invention 200 where host 220 has replaced the participant 120 in FIG. 1. The second embodiment 200 comprises similar components and links, with similar functions, as the components and links in the first embodiment 100 in FIG. 1. The second embodiment 200 comprises VW 110 comprising host avatar 211, host object 212 and VW server 113. The second embodiment 200 further comprises host computing resource 230 comprising host proxy 231. The host computing resource 230 is typically associated with the host 220. The second embodiment 200 further comprises confidential asset server 140. As indicated by a host-to-avatar link 254, host avatar 211 is typically associated with and, at least partially, under the control of the host 220. An avatar-to-object link 255 indicates that host avatar 211 at some time can "see", within the VW 110, host object 212. Data from the VW server 113 goes to the host computing resource 230 through a VW-to-proxy network link 256. Data goes from the confidential asset server 140 to the host proxy 231 through a confidential asset server-to-computing resource network link 252.

The second embodiment 200, shown in FIG. 2, differs from the first embodiment 100, shown in FIG. 1, in that the host 220 replaces the participant 120. The host 220 can function as a meeting participant, but also has additional functions. The host 220 may provide the confidential presentation to the confidential asset server 140 as indicated by the host-to-asset sever link 251. The host 220 may provide the confidential presentation through the host computing resource 230 using the confidential asset server-to-computing resource network link 252. Furthermore, the host 220 controls the confidential presentation, typically through host avatar 211, as indicated by the host-to-avatar link 254 and the avatar-to-object link 255. The host object 212 optionally comprises controls 214 operable by the host 220, typically through host avatar 211. The controls typically comprise control buttons and/or pointers to navigate within the confidential presentation.

As in the first embodiment 100, for the second embodiment 200 shown in FIG. 2, a screen is an object in VW 110, having a UUID. For example, the screen is host object 212 in FIG. 2. In this case, a texture, for example, a slide, can be mapped onto the screen. Alternatively, the screen could comprise a plurality of objects, each object having a UUID. In this case, for each object, a texture, for example, a slide, can be mapped onto the screen.

FIG. 3 illustrates a third embodiment of the invention 300 showing a nonparticipant 320. The nonparticipant is not invited to the confidential presentation, is not authorized to access the confidential asset server, and does not have access to the confidential asset server. The third embodiment of the invention 300 comprises VW 110 comprising nonparticipant avatar 311, nonparticipant object 312, VW server 113, and nonparticipant computing resource 330. The nonparticipant computing resource 330 is typically associated with the nonparticipant 320. As indicated by a nonparticipant-to-avatar link 354, nonparticipant avatar 311 is typically associated with and, at least partially, under the control of the nonparticipant 320. An avatar-to-object link 355 indicates that nonparticipant avatar 311 at some time can "see", within the VW 110, nonparticipant object 312. Data from the VW server 113 goes to the nonparticipant computing resource 330 through a VW-to-computing resource network link 356.

Because the nonparticipant does not have access to the confidential asset server and does not view the confidential presentation, the third embodiment of the invention 300 does not comprise a confidential asset server or a proxy similar to asset server 140 and participant proxy 131.

Although the host object 212 and participant object 112 are within the VW 110, the textures or slide mapped onto the host object 212 and participant object 112, are viewed on host computing resource 230 and participant computer resource 130, respectively. Thus, the textures and slides of the confidential meeting are not within the VW 110.

FIG. 4 illustrates a method 400 for forming a confidential presentation according to an embodiment of the invention. The first step 410 is the providing of the confidential presentation. The host 220 may provide the confidential presentation to the confidential asset server 140 through the host-to-asset server link 251 (FIG. 2). The host 220 may provide the confidential presentation to the confidential asset server 140 using the host computing resource 230. In this case, the confidential asset server-to-computer resource network link 252 is used to provide the confidential presentation to the confidential asset server 140.

The second step 420 is the formation of the map. In one embodiment, all participants will see the same texture on the object or screen. In the VW, the UUID associated with an object always stay the same. A UUID can be mapped to a slide for a particular presentation. In this case, the number of available UUIDs limits the number of slides in the presentation.

The map comprises the required information for mapping the confidential presentation, for example, textures or slides, onto objects, for example, screens. The mapping is expressed as m \in M (m is an element of the set M). The map contains the correspondence of objects to textures wherein the objects are indicated by the UUIDs of the objects. Once a presentation has been uploaded to the confidential asset server, the map is formed. The map is formed, for example, by the host 220 and/or by the confidential asset server 140. The map is formed, for example, automatically by execution of a program, or with manual intervention, for example, by running a program and providing data to the program.

Let U={u1, u2, u3 ... } be a set of UUIDs. Let P={p1, p2, p3 ... } be a set of slide identifiers, for slides stored on a confidential asset server 140, where a slide identifier is sufficient to uniquely reference a slide on the confidential asset server 140. Note that the UUIDs of U and the slide identifiers of P may contain UUIDs and slide identifiers other than those required for a particular confidential presentation. Then the mapping m \in M is a set as follows: m \subseteq U'\times P', where U' is the set of UUIDs for the objects or screens the mapping is designated for, and P' is the set of slide references of the presentation the mapping applies to. Note that |{u: (u_k, p_l) \in m}|=|m|, that is, each UUID in the mapping is mapped to exactly one texture.

FIG. 5 illustrates a map example 500 of a map 510 according to an exemplary embodiment of the invention. In this map example 500, the set of screen UUIDs residing on the confidential asset server 140 is U={u1, u2, u3, u4, u5, u6, u7, u8, u9, u10, u22, u_k}. The set of slide identifiers residing on the confidential asset server is P={p1, p2, p3, p4, p5, p6, p7, p_l}. Not all the screens indicated by the UUIDs within U and not all of the slides indicated by the slide identifiers within P are used in the presentation of the map example 500. The presentation comprises five slides indicated by slide identifiers 511 p1, p2, p3, p4, and p_l. The map 510 shows the screens, indicated by screen UUIDs 512 u1, u2, u3, u22, u_k, corresponding to slides indicated by slide identifiers 511 p1, p2, p3, p4, and p_l. The correspondence contained in the map 510 is u1 to p1, u3 to p2, u_k to p3, u2 to p4, and u22 to p_l.

The confidential asset server 140 stores not only the confidential presentation but also the associated map. Because access to the confidential asset server 140 is restricted to authorized entities, for example, the host 220 and participants 120, availability to the map is likewise restricted.

The third step 430 is authorization of the participants 120. The step 430 of authorization includes, for example, authentication. There are a number of ways known in the art for authorization of a user to access a server, many of which are suitable for authorizing access of participants 120 to attend the confidential presentation through access to the confidential asset server 140. A suitable method of the invention for authorization of a participant 120 to access the confidential asset server 140 and therefore access the confidential presentation is presented herein.

The confidential asset server is adapted to perform at least part of the step of authorizing the participant 120 to access the confidential asset server 140. The confidential asset server 140 provides a token to the host 220. The host 220 distributes the token to the participants 120. The token refers to the map m of the confidential presentation stored on the confidential asset server 140. The participants 120 instruct their local proxies 131 to use the map specified by the token for determining the textures to show on the objects 112.

It must be guaranteed that only authorized users can access the slides for the presentation, that is, the slides referenced by the map m. This can be done by appropriate authentication, for example, using the token, and access control at the confidential asset server 140 side.

The token can be distributed via email or instant message outside of the VW 110. Alternately, the token can be distributed via email or instant message within the VW 110. Any other suitable distribution channel can be used, for example, a file transferred from at least one of the confidential asset server 140 and a host computing resource 230 to at least one of a participant proxy 131 and a participant computing resource 130. Additionally, the token may specify when and in which island/domain of the VW 110 the token is valid. Using this method, the participant proxy 131 does not often need to check for overlays.

The token can be carry authentication functionality towards the confidential asset server 140 to have strong authentication of participants 120 to the confidential asset server 140 and the respective confidential presentation and map. The token can further include pointers/authentication information to set up a secure connection to the confidential asset server 140 and/or information to initiate a related voice-over-Internet-protocol (VOIP) session to realize a conference call.

The participant proxy 131 optionally handles the authentication of the participant 130 to the assert server 140. Authorization of a participant 120 comprises authorization of the participant proxy 131 to access the confidential asset server. Secure authentication is a key element in case of stringent confidentiality requirements.

The host 220 is also a participant 120 in the meeting. Authentication and authorization of the host 220 is similar to authentication and authorization of the participant 120.

The fourth step 440 is for the participant 120 or the participant computing resource 130 to obtain the map of the confidential presentation from the confidential asset server 140. The map is sent from the confidential asset server 140 to the participant computing resource 130 over the confidential asset server-to-computer resource network link 152. Use of the token in obtaining the map has been described above. The participant proxy 131 has access to the map because the map resides on the participant computing resource 130.

The fifth step 450 is obtaining textures from the confidential asset server 140. To display slides, the participant proxy 131 filters the VW data stream. When the participant object 112 comes into the virtual sight of participant avatar 111, participant avatar 111 virtually realizes that a texture corresponding to the UUID of the participant object 112 is to be fetched from the confidential asset server 140. Participant computing resource 130 consults the map of the confidential presentation to determine, based upon the UUID of the participant object 112, the texture that is to be fetched. If the texture corresponding to UUID u_k needs to be obtained, the texture is identified by p_l where (u_k, p_l) \in m. Thus, p_l is obtained from the confidential asset server 140. Thus, the texture is fetched from the confidential asset server 140. Alternately, if the participant proxy 131 has previously fetched this texture, this texture may be obtained from the cache memory of the participant proxy 131.

The sixth step 460 is overlaying the textures. After obtaining a texture, the participant proxy 131 then provides the texture, for example, the texture p_l corresponding to UUID u_k, to the participant computing resource 130 by injecting it into the VW data stream. In addition, the participant proxy 131 may also remove one or more textures from the VW data stream. For example, it may replace a non-confidential texture with a confidential texture, for example, the confidential texture p_l. Textures are only removed, inserted or replaced by proxies with access to the textures, for examples host proxy 231 and participant proxy 131. Host proxy 231 and participant proxy 131 are associated with the host 220 and the participant 120, respectively. As shown in FIG. 3, the nonparticipant 320 does not have a proxy, nor access to the confidential asset server 140. Therefore, the nonparticipant 320 does not have access to the confidential textures, for example, texture p_l.

The data within the confidential textures gets known to the host computing resource 230, and the participant computing resources 130, but not to the VW server 113 or any other user in the system who is a nonparticipant 320 to the confidential presentation. Confidentiality is maintained in a strong sense, that is, the VWs infrastructure does not need to be trusted. The strong trust model, featured by the invention, is essential when hosting meetings in VWs where confidential material is discussed.

The seventh step 470 is displaying the confidential presentation to at least one participant 120 and/or the host 220. After the VW data stream has been filtered, that is, data has been inserted and, optionally, other data has been removed, a resulting data stream is displayed on the participant computing resource 130 and/or on the host computing resource 220. The resulting data stream that is displayed is the confidential presentation.

Because the VW data stream going to a non participant computer resource 330 has not been filtered, that is, no data has been inserted or removed by a proxy similar to participant proxy 131, the nonparticipant 320 does not view the confidential presentation. Instead, the nonparticipant 320 views a default presentation comprised of the original, unfiltered and unmodified VW data stream. The default presentation may comprise, for example, an advertisement.

In an embodiment of the invention, the confidential asset server tailors the one or more textures, for example, slides, for the participant 120 and/or host 220 based upon one or more criteria or one or more attributes associated with the participant 120 and/or host 220. Optionally, different textures or slides can be presented to different participants or to the host. Multiple maps may be formed and used for different participants and the host, enabling different textures or slides to be presented to different participants and/or the host. Each of the multiple maps may map a different texture to the same object or screen.

Examples of criteria or attributes are confidentiality of presentation material, confidentiality level, age, gender, income, occupation, and interests of the participant 120 and/or 220. For example, the host 220 may see the confidential presentation with slide annotations, whereas participants 120 see the confidential presentation without annotations. For another example, a first participant may see slide content that is a subset of slide content seen by a second participant. For instance, a first participant, who is a customer, may see promotional content within a slide, while a second participant, who is a member of a sales team, may see sales quota material in addition to the promotional material. For an additional example, certain advertisements may be restricted from a participant under eighteen years of age. For a further example, advertisements may be targeted based upon preferences. Because of the high security of presentation material, privacy-enhancing attribute-based target advertising/marketing in virtual worlds is fostered.

In yet another embodiment, the confidential asset server may not only show a variety of static textures, but also generate textures dynamically, potentially influenced by the attributes of the participant 120 or host 220.

Figure 6:
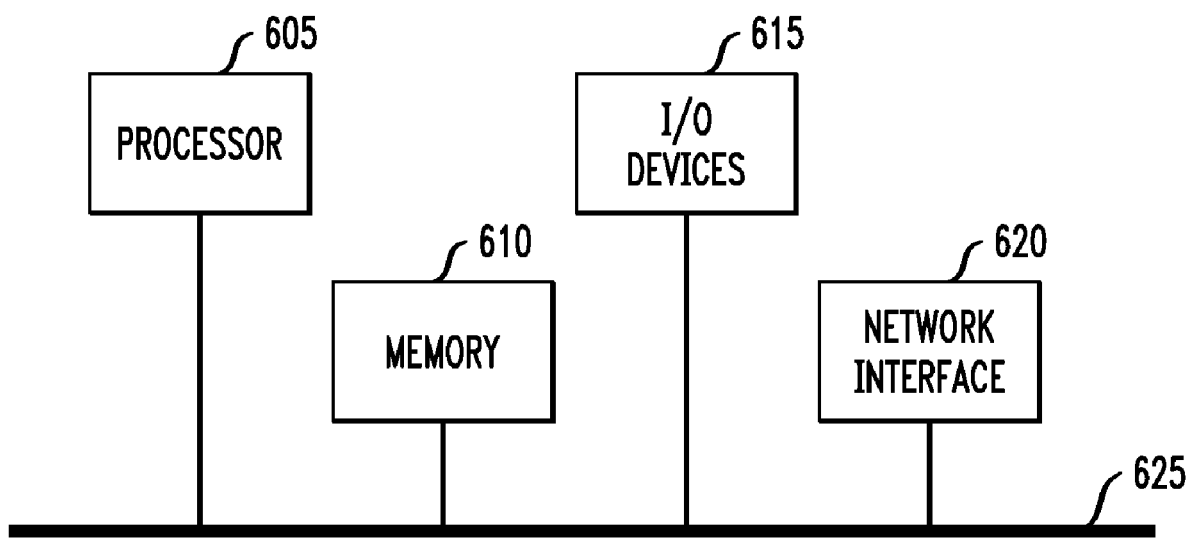
FIG. 6 illustrates a computer system in accordance with which one or more components/steps of the techniques of the invention may be implemented, according to an embodiment of the invention.

FIG. 6 illustrates a computer system 600 in accordance with which one or more components/steps of the techniques of the invention may be implemented. In an embodiment of the invention, confidential asset server 140 comprises processor 605 (FIG. 6). The confidential presentation and/or the map are stored in memory 610. It is to be further understood that the individual components/steps of the invention may be implemented on one such computer system or on more than one such computer system. In the case of an implementation on a distributed computing system, the distributed computer system may comprise one or more computer systems implementing aspects of the invention. The individual computer systems and/or devices may be connected via a suitable network, e.g., the Internet or World Wide Web. However, the system may be realized via private or local networks, for example, an intranet. In any case, the invention is not limited to any particular network. Thus, the computer system shown in FIG. 6 may represent one or more servers, or one or more other processing devices capable of providing all or portions of the functions described herein.

The computer system may generally include the processor 605, the memory 610, input/output (I/O) devices 615, and network interface 620, coupled via a computer bus 625 or alternate connection arrangement.

It is to be appreciated that the term "processor" as used herein is intended to include any processing device, such as, for example, one that includes a central processing unit (CPU) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard disk drive), a removable memory device (e.g., diskette, compact disk, digital video disk or flash memory module), flash memory, non-volatile memory, etc. The memory may be considered a computer readable storage medium.

In addition, the phrase "input/output devices" or "I/O devices" as used herein is intended to include, for example, one or more input devices (e.g., keyboard, mouse, camera, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for forming a confidential presentation, the method comprising the steps of securely maintaining storing textures and correspondence indicators in a memory of a confidential asset server outside a computing environment associated with a virtual application, wherein the confidential asset server does not reside on, and is not accessible by a computing resource maintained by a service provider of the virtual application; obtaining, by an authorized entity, a correspondence indicator from the confidential asset server, wherein the correspondence indicator indicates a first texture that corresponds to a first object, wherein the first object is within the computing environment associated with the virtual application, wherein the first texture comprises confidential content that is securely maintained stored by the confidential asset server outside the computing environment associated with the virtual application; obtaining the first texture from the confidential asset server, wherein the confidential presentation comprises the first texture; overlaying the first texture onto the first object; obtaining a plurality of additional textures from the asset server; and overlaying the plurality of additional textures, wherein the correspondence indicator indicates correspondence between each of a plurality of additional objects and a corresponding one of the plurality of additional textures and wherein the confidential presentation comprises the plurality of additional textures, wherein $P'=\{p1, p2, p3 \ldots p\_n\}$ is a set of texture identifiers comprising a plurality of texture identifiers, $p1, p2, p3 \ldots p\_n$, uniquely identifying each of the plurality of additional textures, wherein $U'=\{u1, u2, u3 \ldots u k\}$ is a set of Universally Unique Identifiers comprising a plurality of Universally Unique Identifiers, u1, u2, u3, . . . u_k, uniquely identifying each of the plurality of additional objects, wherein a correspondence indicator, m \in M, is created that correspond one of the plurality of texture identifiers to each one of the plurality of Universally Unique Identifiers.

2. The method of claim 1, further comprising the steps of:
providing the confidential presentation to the asset server, wherein the confidential presentation is provided by a host;
displaying the confidential presentation;
forming the correspondence indicator; and
authorizing a first participant to access the asset server.

3. The method of claim 1, wherein the confidential presentation comprising the first texture is displayed to a first participant, and wherein the method of claim 1 further comprises the steps of:
obtaining a second texture from the asset server, wherein a second participant correspondence indicator indicates the second texture corresponds to the first object; and
displaying to the second participant a second participant confidential presentation comprising the second texture.

4. The method of claim 3, wherein a content of the second texture is chosen based upon at least one of confidentiality of presentation material, confidentiality level of the second participant, age of the second participant, preferences of the second participant, income of the second participant, occupation of the second participant, interests of the second participant, and gender of the second participant, and wherein the content is generate by one of statically generated and dynamically generated.

5. The method of claim 1, wherein the step of displaying the confidential information comprises displaying the confidential information to at least one of a first participant and a host, wherein the step of the overlaying of the first texture comprises the step of at least one of injecting the first texture into a data stream of the computing environment associated with the virtual application, and removing a second texture from the data stream, wherein the data stream comprises the second texture coming from a server of the computing environment associated with the virtual application, wherein the first texture is overlaid by a proxy, wherein a first Universally Unique Identifier indicates the first object, and wherein the correspondence indicator comprises the correspondence between the first Universally Unique Identifier and the first texture.

6. The method of claim 1, wherein the first object comprises a screen adapted to render the first texture.

7. The method of claim 6, wherein the screen comprises at least one control adapted to perform at least one of navigating within the presentation and pointing within the presentation.

8. The method of claim 1, wherein a first slide of the confidential presentation comprises the first texture.

9. The method of claim 1, wherein a first computing resource comprises a proxy, wherein the proxy is adapted to perform at least one of removing first data and injecting second data into a data stream of the computing environment associated with the virtual application, wherein the data stream comprises the first data coming from a server of the computing environment associated with the virtual application, to the first computing resource, and wherein the proxy is inaccessible by the computing environment associated with the virtual application.

10. The method of claim 1, wherein a nonparticipant is prevented from accessing the asset server, wherein the nonparticipant is prevented from performing the steps of the obtaining of the first texture, the overlaying of the first texture, and the displaying of the confidential presentation, and wherein a second texture is viewed by the nonparticipant.

11. The method of claim 1, wherein a first participant views the confidential presentation, and wherein a nonparticipant views at least one of a default presentation and an advertisement.

12. The method of claim 1, wherein a first participant comprises a plurality of participants, and wherein the plurality of participants views the confidential presentation.

13. The method of claim 1, wherein the first texture comprises at least one of a slide, text, a picture, and a video stream.

14. The method of claim 2, wherein the asset server is adapted to perform at least part of the step of authorizing the first participant to access the asset server, and wherein authorizing the first participant comprises authorizing the proxy to access the asset server.

15. The method of claim 2, wherein the step of authorizing comprises the steps of:
providing a token to the host, wherein the token indicates the correspondence indicator; and
providing the token to the first participant, wherein the token is provided using at least one of an email, an instant message, and a file transferred from at least one of the asset server and a host computing resource to at least one of a proxy and a first participant computing resource.

16. A network, comprising: a confidential asset server to securely maintain store textures and correspondence indicators outside a computing environment associated with a virtual application, wherein the confidential asset server does not reside on, and is not accessible by a computing resource maintained by a service provider of the virtual application; and a proxy authorized to access the confidential asset server and configured to form a confidential presentation by performing the steps of: obtaining a correspondence indicator from the confidential asset server, wherein the correspondence indicator indicates a first texture that corresponds to a first object, wherein the first object is within the computing environment associated with the virtual application, wherein the first texture comprises confidential content that is securely maintained stored by the confidential asset server outside the computing environment associated with the virtual application; obtaining the first texture from the confidential asset server, wherein the confidential presentation comprises the first texture; overlaying the first texture onto the first object, wherein the first texture is overlaid by the proxy; obtaining a plurality of additional textures from the asset server; and overlaying the plurality of additional textures, wherein the correspondence indicator indicates correspondence between each of a plurality of additional objects and a corresponding one of the plurality of additional textures and wherein the confidential presentation comprises the plurality of additional textures, wherein P'={p1, p2, p3 . . . p_n} is a set of texture identifiers comprising a plurality of texture identifiers, p1, p2, p3 . . . p_n, uniquely identifying each of the plurality of additional textures, wherein U'={ul, u2, u3 . . . u k} is a set of Universally Unique Identifiers comprising a plurality of Universally Unique Identifiers, u1, u2, u3, . . . u_k, uniquely identifying each of the plurality of additional objects, wherein a correspondence indicator, m \in M, is created that correspond one of the plurality of texture identifiers to each one of the plurality of Universally Unique Identifiers.

17. The network of claim 16 further comprising:
a first network link between the asset server and the proxy; and
a second network link between the proxy and the computing environment associated with the virtual application, wherein the proxy is outside of the computing environment associated with the virtual application.

18. The network of claim 16, wherein the method for forming the confidential presentation further comprises the steps of:
displaying the confidential presentation;
providing the confidential presentation to the asset server, wherein the confidential presentation is provided by a host;
forming the correspondence indicator; and
authorizing a first participant to access the asset server.

19. Apparatus for forming a confidential presentation, the apparatus comprising:
a memory; and
a processor coupled to the memory and configured to:
obtain a correspondence indicator from a confidential asset server, wherein the confidential asset server securely stores textures and correspondence indicators outside a computing environment associated with a virtual application, wherein the confidential asset server is not accessible by a computing resource maintained by a service provider of the virtual application, wherein the correspondence indicator indicates a first texture that cooresponds to a first object, wherein the first object is within the computing environment associated with the virtual application, wherein the first texture comprises confidential content that is securely stored by the confidential asset server outside the computing environment associated with the virtual application;
obtain the first texture from the confidential asset server, wherein the confidential presentation comprises the first texture;
overlay the first texture onto the first object;
obtain a plurality of additional textures from the asset server; and
overlay the plurality of additional textures, wherein the correspondence indicator indicates correspondence between each of a plurality of additional objects and a corresponding one of the plurality of additional textures and wherein the confidential presentation comprises the plurality of additional textures,
wherein P'={p1, p2, p3 ... p_n} is a set of texture identifiers comprising a plurality of texture identifiers, p1, p2, p3 ... p_n, uniquely identifying each of the plurality of additional textures,
wherein U'={u1, u2, u3 ... u k} is a set of Universally Unique Identifiers comprising a plurality of Universally Unique Identifiers, u1, u2, u3, ... u_k, uniquely identifying each of the plurality of additional objects, wherein a correspondence indicator, m \in M, is created that correspond one of the plurality of texture identifiers to each one of the plurality of Universally Unique Identifiers.

20. An article of manufacture for forming a confidential presentation, the article comprising a computer readable storage medium having one or more programs embodied therewith, wherein the one or more programs, when executed by a computer, perform steps of: securely maintaining storing textures and correspondence indicators in a memory of a confidential asset server outside a computing environment associated with a virtual application, wherein the confidential asset server does not reside on, and is not accessible by a computing resource maintained by a service provider of the virtual application; obtaining, by an authorized entity, a correspondence indicator from the confidential asset server, wherein the correspondence indicator indicates a first texture that corresponds to a first object, wherein the first object is within the computing environment associated with the virtual application, wherein the first texture comprises confidential content that is securely stored by the confidential asset server outside the computing environment associated with the virtual application; obtaining the first texture from the confidential asset server, wherein the confidential presentation comprises the first texture; overlaying the first texture onto the first object; ; obtaining a plurality of additional textures from the asset server; and overlaying the plurality of additional textures, wherein the correspondence indicator indicates correspondence between each of a plurality of additional objects and a corresponding one of the plurality of additional textures and wherein the confidential presentation comprises the plurality of additional textures, wherein P'={p1, p2, p3 ... p_n} is a set of texture identifiers comprising a plurality of texture identifiers, p1, p2, p3 ... p_n, uniquely identifying each of the plurality of additional textures, wherein U'={u1, u2, u3 ... u k} is a set of Universally Unique Identifiers comprising a plurality of Universally Unique Identifiers, u1, u2, u3, ... u_k, uniquely identifying each of the plurality of additional objects, wherein a correspondence indicator, m \in M, is created that correspond one of the plurality of texture identifiers to each one of the plurality of Universally Unique Identifiers.

21. A confidential asset server for forming a confidential presentation, the confidential asset server configured to:
securely maintain store textures and correspondence indicators outside a computing environment associated with a virtual application, wherein the confidential asset server does not reside on, and is not accessible by a computing resource maintained by a service provider of the virtual application; provide a correspondence indicator, wherein the correspondence indicator indicates a first texture that corresponds to a first object, wherein the first object is within the computing environment associated with the virtual application, wherein the first texture comprises confidential content that is securely stored by the confidential asset server outside the computing environment associated with the virtual application; provide the first texture, wherein the confidential presentation comprises the first texture; provide a plurality of additional textures, wherein the correspondence indicator indicates correspondence between each of a plurality of additional objects and a corresponding one of the plurality of additional textures and wherein the confidential presentation comprises the plurality of additional textures, wherein P'={p1, p2, p3 ... p_n} is a set of texture identifiers comprising a plurality of texture identifiers, p1, p2, p3 ... p_n, uniquely identifying each of the plurality of additional textures, wherein U'={u1, u2, u3 ... u k} is a set of Universally Unique Identifiers comprising a plurality of Universally Unique Identifiers, u1, u2, u3, ... u_k, uniquely identifying each of the plurality of additional objects, wherein a correspondence indicator, m \in M, is created that correspond one of the plurality of texture identifiers to each one of the plurality of Universally Unique Identifiers.

22. The asset server of claim 21 further configured to:
authorize a first participant to access the asset server; and
store the confidential presentation and the correspondence indicator.

* * * * *